US010730978B2

(12) United States Patent
Yang et al.

(10) Patent No.: US 10,730,978 B2
(45) Date of Patent: Aug. 4, 2020

(54) LINEAR ETHYLENE CYCLIC OLEFIN POLYMERS

(71) Applicant: ExxonMobil Chemical Patents Inc., Baytown, TX (US)

(72) Inventors: Yong Yang, Kingwood, TX (US); Rhutesh K. Shah, Katy, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 34 days.

(21) Appl. No.: 15/937,639

(22) Filed: Mar. 27, 2018

(65) Prior Publication Data
US 2018/0291128 A1 Oct. 11, 2018

Related U.S. Application Data

(60) Provisional application No. 62/483,713, filed on Apr. 10, 2017.

(51) Int. Cl.
C08F 210/18 (2006.01)
C08F 4/6592 (2006.01)
C08F 210/02 (2006.01)
C08F 4/659 (2006.01)

(52) U.S. Cl.
CPC .......... C08F 210/18 (2013.01); C08F 210/02 (2013.01); C08F 4/65908 (2013.01)

(58) Field of Classification Search
CPC . C08F 4/65927; C08F 4/65912; C08F 210/18
See application file for complete search history.

(56) References Cited

U.S. PATENT DOCUMENTS

| 5,087,677 A | 2/1992 | Brekner et al. |
| 5,629,398 A | 5/1997 | Okamoto et al. |
| 5,635,573 A | 6/1997 | Harrington et al. |
| (Continued) | | |

FOREIGN PATENT DOCUMENTS

| DE | 10296812 T5 | 12/1997 | ............. C07F 17/00 |
| EP | 0407870 | 4/2004 | ............. C08F 210/02 |
| (Continued) | | | |

OTHER PUBLICATIONS

A. Manteghi, et al. "Synthesis, characterization, rheological and thermal behavior of metallocene ethylene-norbornene copolymers with low norbornene content using pentafluorophenol modified methylaluminoxane." Polymer International, vol. 64(7), pp. 900-906, Wiley Online Library: Jan. 30, 2015 (online).
(Continued)

Primary Examiner — Caixia Lu
(74) Attorney, Agent, or Firm — Catherine L. Bell

(57) ABSTRACT

A polymer obtained by a solution polymerization process comprising within a range from 0.5 to 20 wt % of cyclic olefin derived units, within a range from 0 wt % to 15 wt % C4 to C12 α-olefin derived units, the remainder being ethylene derived units; and having a Mw/Mn of less than 2.5; a weight average molecular weight (Mw) within a range from 80,000 to 300,000 g/mole; and a g' value of greater than 0.95. The polymer may be formed in a solution polymerization process comprising combining in a solution cyclic olefins, ethylene, hydrogen and optionally C4 to C12 α-olefins with a single-site catalyst to form the polymer, wherein the single-site catalyst is most preferably selected from unsymmetrical Group 4 bis-bridged cyclopentadienyl metallocenes.

27 Claims, 9 Drawing Sheets

(56) References Cited

U.S. PATENT DOCUMENTS

| | | | |
|---|---|---|---|
| 5,942,587 A | 8/1999 | Arjunan et al. | |
| 6,111,019 A | 8/2000 | Arjunan et al. | ........ C08L 23/06 |
| 6,506,857 B2 | 1/2003 | Rix | |
| 6,870,010 B1 | 3/2005 | Lue | |
| 9,321,911 B2 | 4/2016 | Shirodkar et al. | |
| 2003/0130452 A1 | 7/2003 | Johnson et al. | |

FOREIGN PATENT DOCUMENTS

| | | |
|---|---|---|
| WO | 99/26989 A | 6/1999 |
| WO | 2015/142547 A | 9/2015 |
| WO | 2017/138981 A | 8/2017 |

OTHER PUBLICATIONS

P. J. Doerpinghaus, et al. "Separating the effects of sparse long-chain branching on rheology from those due to molecular weight in polyethylenes." Journal of Rheology, vol. 47(3), pp. 717-736, The Society of Rheology: Jun. 2003.

LINEAR ETHYLENE CYCLIC OLEFIN POLYMERS

CROSS REFERENCE TO RELATED APPLICATIONS

This application claims the benefit of priority from U.S. Provisional Application No. 62/483,713, filed Apr. 10, 2017, which is incorporated herein by reference.

FIELD OF THE INVENTION

The present invention relates to a linear poly(ethylene-co-cyclic olefin) copolymers and linear poly(ethylene-co-α-olefin-co-cyclic olefin) terpolymers having improved processability and strain hardening.

BACKGROUND

Linear low density polyethylene (LLDPE) is a copolymer of ethylene with a minor amount of comonomers, typically acyclic $C_3$-$C_8$ α-olefins. The short-chain branching in such polymers in an otherwise linear backbone gives LLDPE unique mechanical properties and processing attributes compared with highly branched low density polyethylene (LDPE) produced by a high pressure radical process, and unbranched high density polyethylene (HDPE) made from a low pressure metal-catalyzed process. Due to the relatively low cost and its satisfactory overall mechanical properties, LLDPE is widely employed as the major component in films. However, the lack of some rheological characteristics such as shear thinning, strain hardening, and melt strength gives rise to processing difficulty in fabrication of LLDPE into films by techniques such as blown bubble extrusion, or in making foamed articles. Typically, LDPE is added to LLDPE to improve its melt strength and bubble stability, but at the same time some mechanical properties such as impact toughness are compromised.

Various approaches around the combination and optimization of long-chain branching structure and compositional/molecular weight distributions have been explored, but the incremental gains obtained are difficult to implement commercially. A norbornene comonomer approach was previously explored in U.S. Pat. No. 5,942,587 to make poly (ethylene-co-α-olefin-co-cyclic olefin) terpolymers, or "cyclic olefin copolymers" (COC's). The COC's produced by a gas-phase process and heterogeneous catalysis had significantly improved tensile strength and modulus and Elmendorf tear properties, but decreased Dart Drop impact. The gas-phase COC's had relatively broad composition and molecular weight distributions but it is not clear from this reference if the COC's are linear or branched. The gas-phase COC's also showed minimal to modest improvements in shear thinning and melt strength. Thus, the gas-phase COC's didn't exhibit an ideal balance of mechanical properties. What is needed is a polyethylene having a better balance of properties when made into useful films and other articles, while having improved processability.

Other references include U.S. Pat. Nos. 5,087,677; 5,635,573; 5,629,398; 9,321,911; and US 2003/0130452.

SUMMARY

Provided herein is a polymer obtained by a solution polymerization process comprising (or consisting essentially of, or consisting of) within a range from 0.5, or 1, or 2, or 4 to 10, or 15, or 20 wt % of cyclic olefin derived units, within a range from 0, or 1 wt % to 10, or 15 wt % C4 to C12 α-olefin derived units, the remainder being ethylene derived units; and having a Mw/Mn of less than 2.5; a weight average molecular weight (Mw) within a range from 80,000 to 300,000 g/mole; and a g' value of greater than 0.95.

Also provided is a process to form a polymer comprising (or consisting essentially of, or consisting of) combining in a solution cyclic olefins, ethylene, hydrogen and optionally C4 to C12 α-olefins with a single-site catalyst to form the polymer, wherein the single-site catalyst is preferably selected from Group 4 metallocenes, most preferably unsymmetrical Group 4 bis-bridged cyclopentadienyl metallocenes.

DETAILED DESCRIPTION

Figure 1:
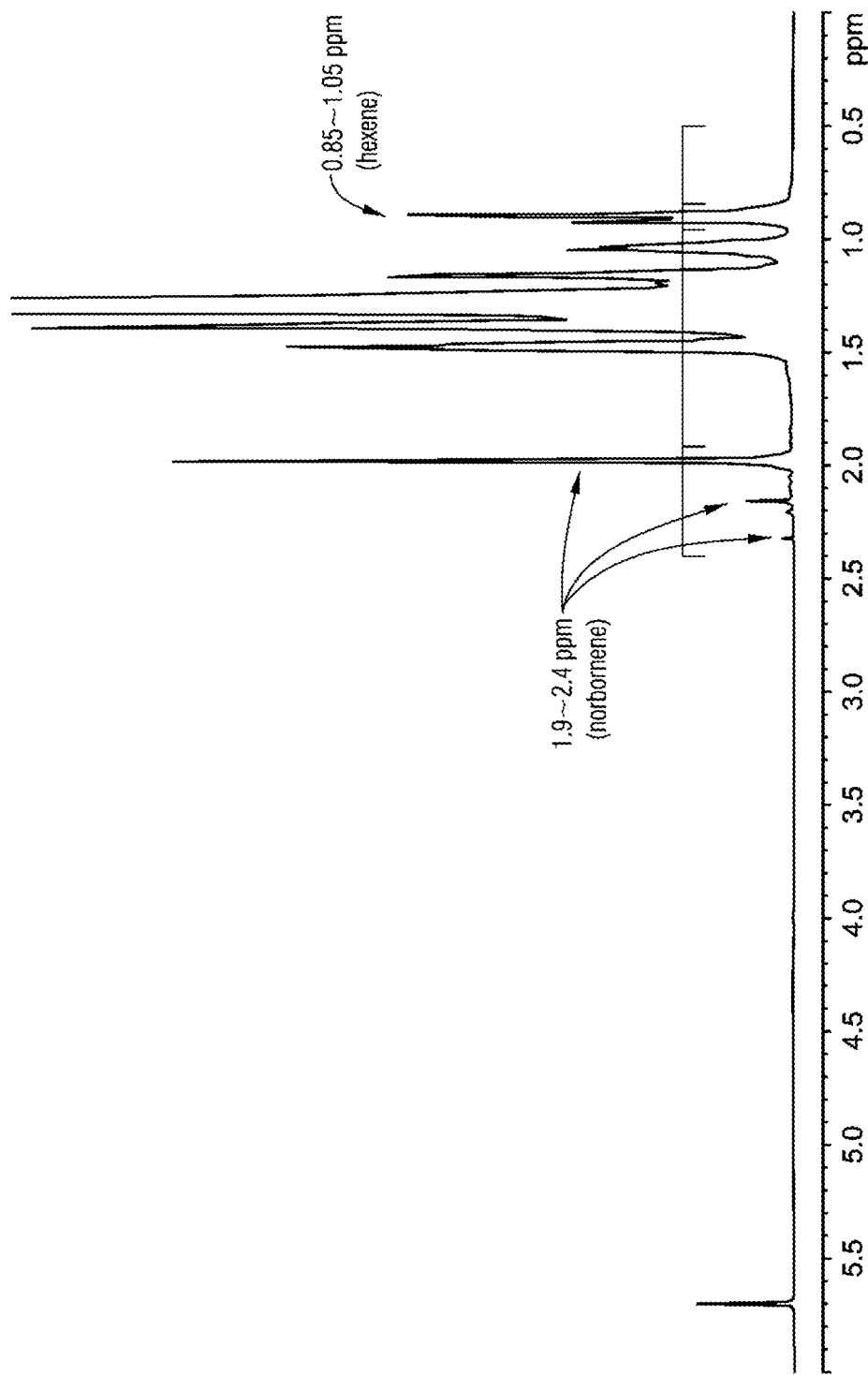
FIG. 1 is an $^1$H NMR of the inventive example 1, ethylene-norbornenes-hexene terpolymer.

The inventors have surprisingly found that the process that is used to make polyethylene can influence the structure of the final product, especially a process that uses single-site catalysts, preferably selected from Group 4 metallocenes, and most preferably selected from unsymmetrical Group 4 bis-bridged cyclopentadienyl metallocenes. The process disclosed herein for forming the polyethylene is a solution process, described further below. The process is characterized in having the catalyst, monomers, and resulting polymer dissolved in the reaction solvent, which can be an inert hydrocarbon and/or one or more monomers.

As used herein "Group 4" refers to the new notation of the Periodic Table of the Elements as published in HAWLEY'S CONDENSED CHEMICAL DICTIONARY, 13$^{th}$ Edition (John Wiley & Sons, Inc. 1997).

Also as used herein "combining" means that the named components are brought together to make contact with one another, such as in a polymerization reactor, under such conditions of temperature, pressure, solvent, and other environmental conditions that effect a chemical reaction between one or more monomers that is typically catalyzed by the presence of a catalyst precursor and activator.

In any embodiment, the cyclic olefin monomer that is combined with ethylene monomers in the polymerization process is selected from C5 to C8, or C12, or C16, or C20 olefins comprising at least one C5 to C8 cyclic structure, such as, for example, bicyclo compounds such as bicyclo-(2,3,1)-heptene-2. Preferably the cyclic olefin is selected from C5, or C6 to C8, or C10, or C12, or C20 cyclic olefins, and more preferably bicyclic olefins which are cyclic olefins containing a bridging hydrocarbon moiety that forms two rings in the overall structure such as in bicyclo-(2,3,1)- heptene-2 (norbornenes). Most preferably the cyclic olefins are selected from norbornenes, tetracyclododecene, and substituted versions thereof. In order to effect the polymerization process upon combining, as well as combining at a desirable temperature, the components are preferably combined at a pressure of at least 0.8, or 1, or 2, or 3 MPa; or within a range from 0.8, or 1, or 2, or 3 MPa to 4, or 6, or 8, or 10 MPa. This pressure can come from the addition of the ethylene and/or other gases in the polymerization reactor, and is of course influenced by the temperature of the reactor. The level of ethylene and cyclic olefin is adjusted to obtain the desired catalytic activity as well as desired level of cyclic olefin comonomer incorporation into the polyethylenes described herein. In any embodiment the combining of the monomers with catalyst can take place at a reaction temperature, the average temperature within the vessel or reactor used to combine the components to effect polymerization, within the range from 80, or 85, or 90, or 100° C. to 120, or 130, or 140, or 150° C.

More particularly, the various monomers and catalyst precursors and activators are preferably combined in a polymerization reactor where they are allowed to react at the desired monomer concentrations, catalyst concentrations, temperatures and pressures. In any embodiment, the contacting takes place in a polymerization reactor having an inlet for the monomer and/or catalyst feeds, and an outlet for the effluent of the polymerization reaction, wherein the amount of polyethylene in the effluent is within a range from 2 or 4 or 6 wt % to 12 or 14 or 16 or 20 wt % based on the weight of the components in the solvent of the effluent stream. The polymerization reaction may be any type of polymerization useful in forming polyolefins such as so-called gas phase reactions, solution reactions or slurry reactions, preferably continuous solution, slurry or gas phase reactions.

In any embodiment, the polyethylene is made in what is commonly known as "solution" process. For example, copolymerizations are preferably carried out in one or more single-phase, liquid-filled, stirred tank reactors with continuous flow of feeds to the system and continuous withdrawal of products under steady state conditions. When more than one reactor is used, the reactors may be operated in a serial or parallel configuration making essentially the same or different polymer components. Advantageously, the reactors may produce polymers with different properties, such as different molecular weights, or different monomer compositions, or different levels of long-chain branching, or any combinations thereof. All polymerizations can be performed in a system with a solvent comprising any one or more of C4 to C12 alkanes and/or the olefin monomers, using soluble metallocene catalysts or other single-site catalysts and discrete, non-coordinating borate anions as co-catalysts. A homogeneous dilute solution of tri-n-octyl aluminum in a suitable solvent may be used as a scavenger in concentrations appropriate to maintain reaction. Chain transfer agents, such as hydrogen, can be added to control molecular weight. Polymerizations can be at high temperatures described above and high conversions to maximize macromer reinsertions that create long chain branching, if so desired. This combination of a homogeneous, continuous, solution process helps to ensure that the polymer products have narrow composition and sequence distributions.

In any embodiment, hydrogen is also combined with the monomers and catalyst, and most preferably is present within a range from 4, or 5 to 20, or 25, or 30, or 40, or 50, or 100, or 200 cm$^3$/min (SCCM).

In any embodiment, the contacting (or polymerization) takes place in one stage or under one set of conditions, even if performed in two or more reactors, to produce the polyethylene.

In any embodiment, the reactor(s) can be maintained at a pressure in excess of the vapor pressure of the reactant mixture to keep the reactants in the liquid phase. In this manner the reactors can be operated liquid-full in a homogeneous single phase. Ethylene and cyclic olefin feeds (as well as optional propylene, C4 to C12 α-olefins and/or dienes) can be combined into one stream and then mixed with a pre-chilled hexane stream. A solution of a tri-n-octyl aluminum scavenger in a desirable solvent may be added to the combined solvent and monomer stream just before it entered the reactor to further reduce the concentration of any catalyst poisons. A mixture of the catalyst components (catalyst precursor and/or activator) in solvent may be pumped separately to the reactor and entered through a separate port. In another embodiment, cooled isothermal reactors can be used that do not require feed chilling.

Optional "dienes" may be added to the polymerization medium, including so-called "dual-polymerizable dienes" and "non-conjugated dienes". In any embodiment, the "dual-polymerizable dienes" are selected from vinyl substituted strained bicyclic and unconjugated dienes, and alpha-omega linear dienes where both sites of unsaturation are polymerizable by a polymerization catalyst (e.g., Ziegler-Natta, vanadium, metallocene, etc.); and more preferably from non-conjugated vinyl norbornenes and C8-C12 alpha-omega linear dienes (e.g., 1,7-heptadiene and 1,9-decadiene), and is most preferably 5-vinyl-2-norbornene. In any embodiment, the mole percent of the dual-polymerizable diene that is combined (i.e., present in the feed leading to the polymerization reactor) is less than 0.30, or 0.28, or 0.26 mol % relative to the other monomers, or within a range from 0.05 to 0.26 or 0.28 or 0.30 mol %. The polyethylene formed therefrom comprise "dual-polymerizable diene derived monomer units".

In any embodiment, a "non-conjugated diene" is one in which only one of the double bonds is activated by a polymerization catalyst and is selected from cyclic and linear alkylenes, non-limiting examples of which include 1,5-cyclooctadiene, an unconjugated diene (and other structures where each double bond is two carbons away from the other), norbornadiene, and other strained bicyclic and unconjugated dienes, and dicyclopentadiene. More preferably, the non-conjugated diene is selected from C7 to C30 cyclic non-conjugated dienes. Most preferably the non-conjugated diene is 5-ethylidene-2-norbornene. The polyethylene formed therefrom comprises "non-conjugated diene derived monomer units".

Most preferably, dienes are absent from the polymerization process, that is, they are not purposefully combined with the cyclic olefin, ethylene, and catalyst components in any stage of the process of forming the polyethylene's described herein.

The solution reaction mixture may be stirred aggressively by any means known in the art to provide thorough mixing over a broad range of solution viscosities. Flow rates can be set to maintain an average residence time in the reactor of 5 to 10 or 20 mins. On exiting the reactor the copolymer mixture may be subjected to quenching, a series of concentration steps, heat and vacuum stripping and pelletization, or alternatively, may be fed to a subsequent reactor where another α-olefin such as propylene will be copolymerized, or fed to a line containing solution or slurry (or a combination of both) polyolefin where intimate mixing may occur.

Water or water/alcohol mixture is then supplied to quench the polymerization reaction, which might otherwise continue in the presence of surviving catalyst, unreacted monomer, and elevated temperature. Antioxidants can be also used to quench the polymerization reaction.

The polyethylene can be recovered from the effluent of by separating the polymer from other constituents of the effluent using conventional separation means. For example, polymer can be recovered from either effluent by liquid-liquid separation or coagulation with a non-solvent, such as methanol, isopropyl alcohol, acetone, or n-butyl alcohol, or the polymer can be recovered by stripping the solvent or other media with heat or steam. After removal of solvent and monomer, pelletized polymer can be removed from the plant for physical blending with polyolefin. If in situ blends are preferred, the removal of solvent takes place after intimate mixing with the solution or slurry phase polyolefin.

The lean phase and volatiles removed downstream of the liquid phase separation can be recycled to be part of the polymerization feed. In the process, a degree of separation and purification takes place to remove polar impurities or internally unsaturated olefins that might undermine the activity of the catalyst. Otherwise any internally unsaturated olefins, which are difficult to polymerize would gradually build up in the lean phase and recycle streams. Any adverse effects on the polymerization activity may be mitigated by removing these olefins from the recycle stream and/or encouraging their incorporation in the polymer, favored by high polymerization temperatures. Such methods are well known in the art.

Thus provided is a process to form a polyethylene comprising (or consisting essentially of, or consisting of) combining in a solution polymerization process cyclic olefins, ethylene, hydrogen and optionally C4 to C12 α-olefins with a single-site catalyst to form the polyethylene. Many organometallic compounds are known as useful single-site catalysts such as metallocenes (MN), pyridiyldiamide transition metal catalysts, alkoxide and/or amide transition metal catalysts, bis(imino)pyridyl transition metal catalysts, and many other organometallic compounds useful in polyolefin catalysis known in the art. These compounds are accompanied by activator compounds such as methylalumoxane or boron activators, especially perfluorinated aryl compounds. Together, these and other organometallic compounds known in the art form the "single-site catalysts", such as reviewed by H. Kaneyoshi et al., "Nonmetallocene single-site catalysts for polyolefins" in Research Review (McGraw Hill, 2009); C. De Rosa et al. "Single site metalorganic polymerization catalysis as a method to probe the properties of polyolefins" in 2 POLYM. CHEM. 2155 (2012); I. E. Sedov et al. "Single-site catalysts in the industrial production of polyethylene," 4(2) CATALYSIS IN INDUSTRY 129-140 (2012); and G. W. Coates, "Precise control of polyolefin stereochemistry using single-site metal catalysts," 100 CHEM. REV. 1223 (2000). Most preferably, the single-site catalyst used to make the useful ssPP's herein are metallocenes, accompanied by any type of activator compound, such as described in, for example, U.S. Pat. Nos. 8,318,875; 8,143,353; and 7,524,910.

Thus in any embodiment the single-site catalyst is selected from Group 4 metallocenes, most preferably unsymmetrical Group 4 bis-bridged cyclopentadienyl metallocenes.

Even more preferably, in any embodiment, the Group 4 metallocenes or Group 4 bis-bridged cyclopentadienyl metallocenes are those that comprise (or consist of) two cyclopentadienyl ligands and/or ligands isolobal to the cyclopentadienyl group such as those selected from indenyl, benzindenyl, fluorenyl, octahydrofluorenyl, cyclooctatetraenyl, cyclopentaphenanthrenyl, hydrogenated or partially hydrogenated versions thereof, substituted versions thereof, and heterocyclic versions (preferably one or two substitutions of ring carbons for nitrogen, oxygen, sulfur, silicon, and/or phosphorous) thereof.

By "unsymmetrical" what is meant is that the two cyclopentadienyl ligands are distinct from one another at least by pattern and identity of substitution, but most preferably different by the ring structure itself.

As used herein "substituted versions thereof" or "substituted" in reference to a hydrocarbon means that the named hydrocarbon moiety may also comprise, in place of one or more hydrogens, preferably one to two hydrogens, a C1 to C6 alkyl, preferably methyl or ethyl, a phenyl or other C7 to C20 aromatic hydrocarbon (or "aryl"), an aniline, imidazole or other nitrogen heterocycle, halogen, hydroxyl, carboxylate, succinate, glycol, and/or mercaptans.

In any embodiment, at least one of the two ligands is mono- or di-substituted with groups selected from C1 to C12 alkyls, C3 to C16 iso-alkyls, C6 to C24 aryls, C9 to C24 fused multi-ring aryls, C5 to C20 nitrogen and/or sulfur heterocycles, and combinations thereof. More preferably, at least one of the two ligands is mono- or di-substituted with groups selected from iso-propyl, iso-butyl, tert-butyl, phenyl, alkylphenyl, and dialkylphenyl. Also, in any embodiment, the bridging group that covalently links the any two ligands described herein comprises at least one phenyl group, alkyl substituted phenyl group, or silyl substituted phenyl group.

In any embodiment, the single-site catalyst is selected from the following structures (I):

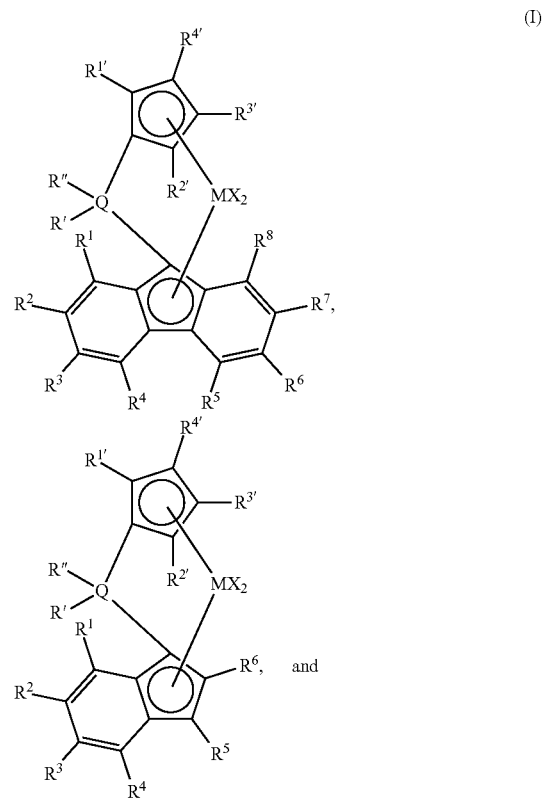

-continued

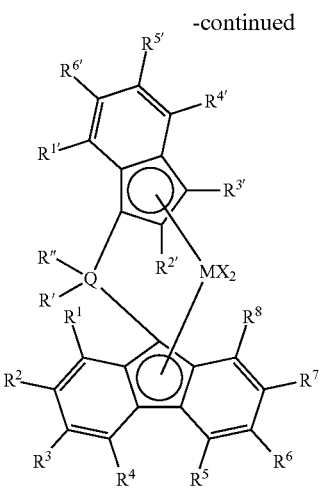

wherein M is a Group 4 metal, preferably zirconium or hafnium; Q is silicon or carbon; each of R' and R" are independently selected from phenyl, alkyl substituted phenyl, and silyl substituted phenyl; each X is independently selected from C1 to C10 alkyls, phenyls, and halogens; each of $R^1$ to $R^8$ is independently selected from hydrogen, C1 to C10 alkyls, phenyls, and alkylphenyls; and each of $R^{1'}$ to $R^{6'}$ is independently selected from hydrogen, C1 to C10 alkyls, and phenyls.

More preferably, the single-site catalyst is selected from the following structure (II):

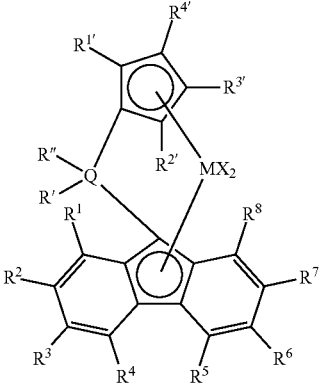

wherein M is a Group 4 metal, preferably zirconium or hafnium, most preferably hafnium; Q is silicon or carbon, most preferably carbon; each of R' and R" are independently selected from phenyl, alkyl substituted phenyl, and silyl substituted phenyl, most preferably C1 to C4 or C6 alkyl-silyl substituted phenyl; each X is independently selected from C1 to C10 alkyls, phenyls, and halogens; each of $R^1$ to $R^8$ is independently selected from hydrogen, C1 to C10 alkyls, phenyls, and alkylphenyls, most preferably $R^2$ and $R^7$ are C2 to C6 linear or branched alkyls and the remaining R groups are hydrogen atoms; and each of $R^{1'}$ to $R^{6'}$ is independently selected from hydrogen, C1 to C10 alkyls, and phenyls, most preferably hydrogen. In any embodiment, the M in any of the structures above is hafnium, and each of R' and R" are phenyl-p-tri-(C1 to C6)-silyl groups.

The catalyst precursor must also be combined with at least one activator to effect polymerization of the cyclic olefin monomers and ethylene, wherein the activator preferably comprises a non-coordinating borate anion and a bulky organic cation. In any embodiment, the non-coordinating borate anion comprises a tetra(perfluorinated C6 to C14 aryl)borate anion and substituted versions thereof; most preferably the non-coordinating borate anion comprises a tetra(pentafluorophenyl)borate anion or tetra(perfluoronaphthyl)borate anion. Preferably the bulky organic cation is selected from the following structures (IIIa) and (IIIb):

wherein each R group is independently hydrogen, a C6 to C14 aryl (e.g., phenyl, naphthyl, etc.), a C1 to C10 or C20 alkyl, or substituted versions thereof; and more preferably at least one R group is an C6 to C14 aryl or substituted versions thereof.

In any embodiment, the bulky organic cation is a reducible Lewis Acid, especially a trityl-type cation (wherein each "R" group in (IIIa) is aryl) capable of extracting a ligand from the catalyst precursor, where each "R" group is an C6 to C14 aryl group (phenyl, naphthyl, etc.) or substituted C6 to C14 aryl, and preferably the reducible Lewis acid is triphenyl carbenium and substituted versions thereof.

Also, in any embodiment, the bulky organic cation is a Brønsted acid capable of donating a proton to the catalyst precursor, wherein at least one "R" group in (IIIb) is hydrogen. Exemplary bulky organic cations of this type in general include ammoniums, oxoniums, phosphoniums, silyliums, and mixtures thereof; preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, and p-nitro-N,N-dimethylaniline; phosphoniums from triethylphosphine, triphenylphosphine, and diphenylphosphine; oxoniums from ethers, such as dimethyl ether diethyl ether, tetrahydrofuran, and dioxane; and sulfoniums from thioethers, such as diethyl thioethers and tetrahydrothiophene, and mixtures thereof.

The catalyst precursor preferably reacts with the activator upon their combination to form a "catalyst" or "activated catalyst" that can then effect the polymerization of monomers. The catalyst may be formed before combining with monomers, after combining with monomers, or simultaneous therewith.

The result of the polymerization reaction upon combining the components, in any embodiment, is the polyethylene comprising (or consisting essentially of, or consisting of) within the range from 0.5, or 1, or 2, or 4 to 10, or 15, or 20 wt % of cyclic olefin derived units, within a range from 0, or 1 wt % to 10, or 15 wt % C4 to C12 α-olefin derived units, the remainder being ethylene derived units. Most preferably is a polyethylene comprising (or consisting essentially of, or consisting of) within the range from 0.5, or 1, or 2, or 4 to 10, or 15, or 20 wt % of cyclic olefin derived units, the remainder being ethylene derived units.

In any embodiment the cyclic olefin derived units are selected from C5 to C20 olefin derived units comprising at least one C5 to C8 cyclic structure. In any embodiment the cyclic olefin derived units are norbornene or C1 to C10 alkyl-substituted norbornene derived units. Most preferably the polyethylene consists of cyclic olefin derived units and ethylene derived units.

The level of branching as well as the molar mass of the polyethylenes may be controlled by known means such as addition of hydrogen to the polymerization reactor when combining the monomers with the catalyst to effect polymerization. In any embodiment, the number average molecular weight (Mn) of the polyethylenes described herein is within a range from 20, or 30 kg/mole to 60, or 80, or 100, or 140 kg/mole. In any embodiment, the weight average molecular weight (Mw) of the polyethylene is within a range from 80, or 100 kg/mole to 120, or 140, or 160, or 200, or 300 kg/mole. In any embodiment, the z-average molecular weight (Mz) of greater than 180 kg/mole, or within a range from 180, or 200, or 210 kg/mole to 250, or 280, or 300 kg/mole. In any embodiment, the polyethylenes have an Mw/Mn of less than 2.5, or 2.3, or 2.2, or a Mw/Mn value within a range from 1, or 1.1, or 1.2 to 1.8, or 2, or 2.2, 2.3, or 2.5. In any embodiment, the polyethylenes described herein have an Mz/Mw of less than 2.5, or 2, or within a range from 1.2, or 1.5 to 2 or 2.5.

In any embodiment, the polyethylenes are substantially linear, meaning that long chain branching is absent (chains longer than 6-10 carbon atoms). Most preferably, the polyethylenes have a g' (or $g'_{vis}$) value of greater than 0.95, or 0.96, or 0.97, where a value of "1" reflects an ideally linear polyethylene.

The polyethylenes surprisingly exhibit improved shear thinning as reflected for example in having a complex viscosity that is relatively high at low shear rates and relatively low at high shear rates. This behavior results in a complex viscosity versus shear rate plot that is nearly linear or linear, having a negative slope such as in FIG. 4. Thus in any embodiment the polyethylenes have a complex viscosity of at least 70, or 80, or 90 kPa·s at a shear rate of 0.01 s$^{-1}$ at 190° C., or within a range from 70, or 80, or 90 kPa·s to 120, or 140, or 160 kPa·s. Also in any embodiment the polyethylenes have a complex viscosity of less than 40, or 30, or 20, or 10 kPa·s at a shear rate of 100 s$^{-1}$ at 190° C., or within a range from 40, or 30, or 20, or 10 to 5 kPa·s.

Figure 6A:
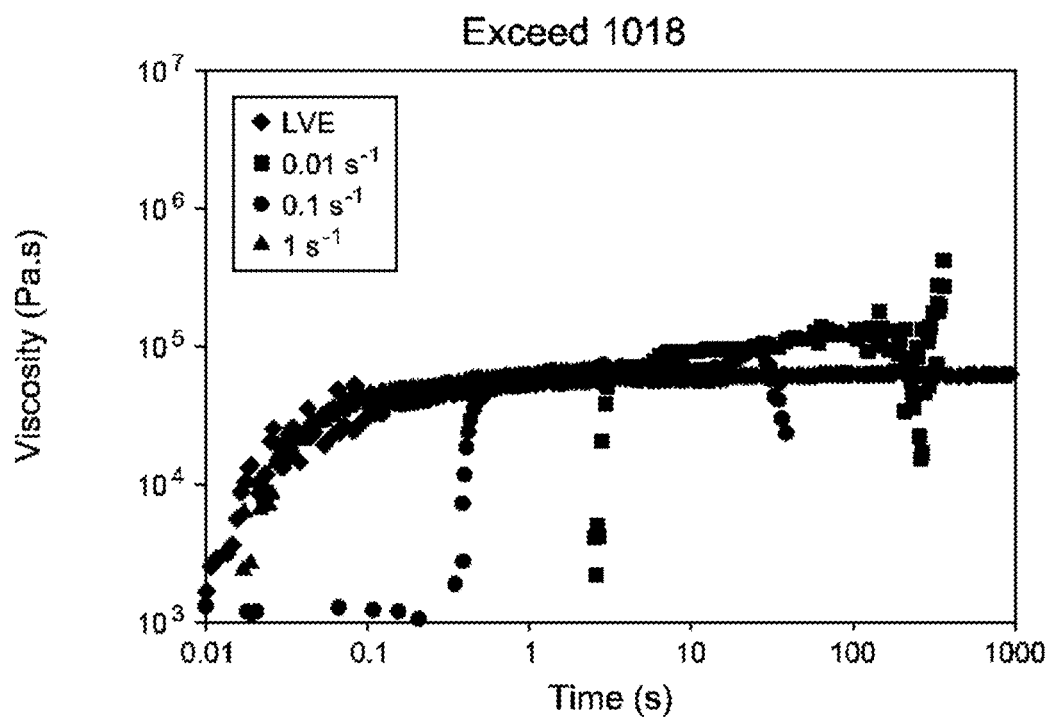
FIGS. 6a-d are extensional rheology profiles for comparative and inventive polyethylenes.
Figure 6B:
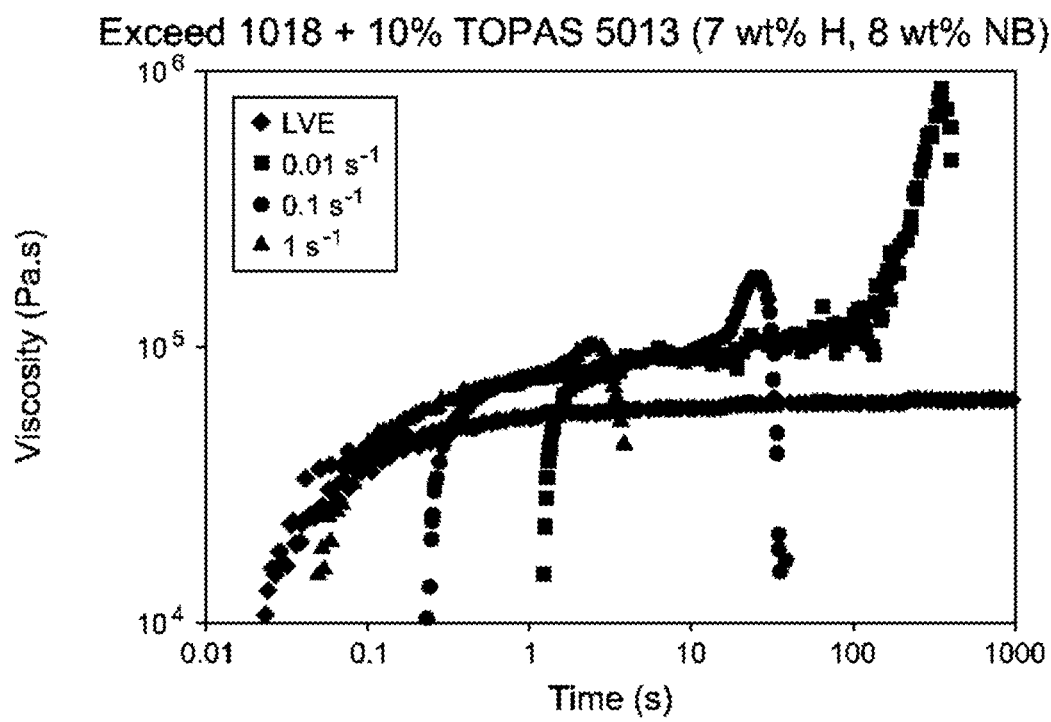
Figure 6C:
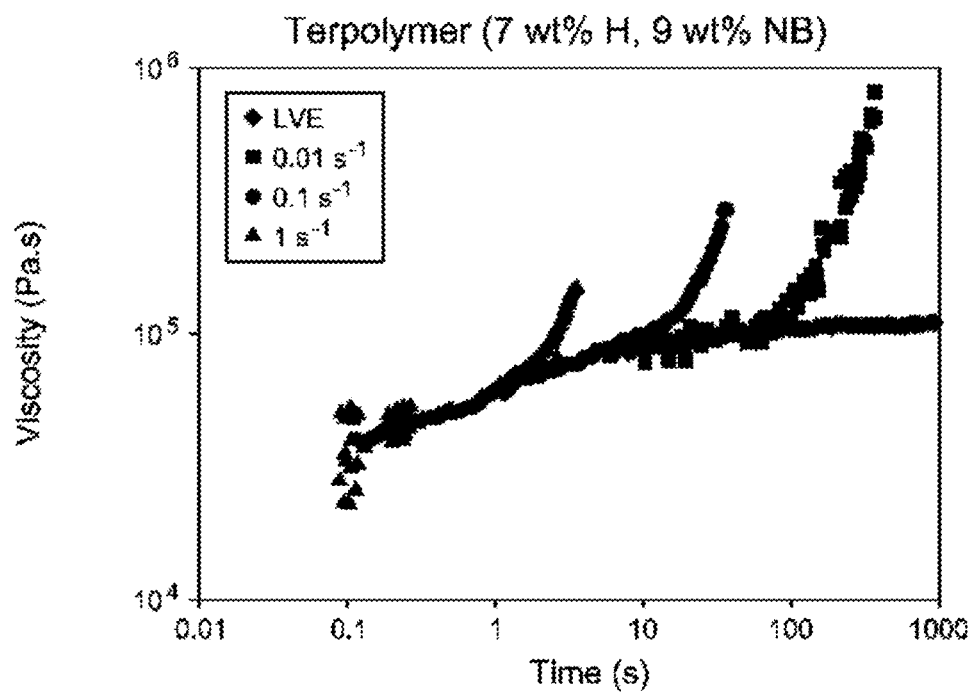
Figure 6D:
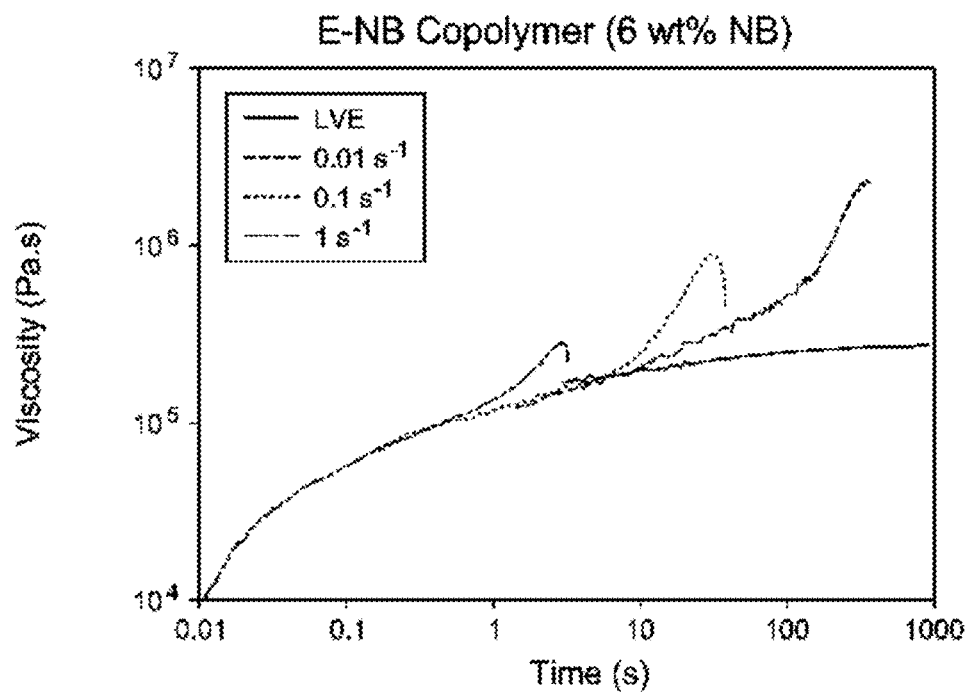

The polyethylenes surprisingly exhibit improved strain hardening as reflected for example in having an increasing viscosity at over time at various shear rates such as demonstrated in FIG. 6d. Preferably the polyethylenes exhibit a detectable extensional viscosity past the peak extensional viscosity, not dropping to zero viscosity after reaching a peak. Thus in any embodiment the polyethylenes have a peak extensional viscosity of at least 600, or 700, or 800, or 900 kPa·s (above the linear viscoelastic limit or "LVE") at a strain rate of 0.1 s$^{-1}$ at 150° C., or within a range from 600, or 700, or 800, or 900 kPa·s to 1000, or 1500, or 2000 kPa·s. Also in any embodiment the polyethylenes have a strain hardening ratio (SHR) of greater than 3, or 3.2 at 150° C. at 0.1 s$^{-1}$ strain rate, or within a range from 3, or 3.2 to 4, or 5, or 6.

In any embodiment, the polyethylene exhibits rod-like morphology such as demonstrated by Atomic Force Microscopy, having dimensions within a range from 1 to 10 nm in width and 50 to 1000 nm in length below solidifying temperature.

The polyethylenes described herein are useful in any number of articles such as films (average thickness of less than 200 μm) sheets (average thickness of greater than or equal to 200 μm), molded articles (e.g., thermoformed, blow molded, extrusion molded, etc.), and tubing or piping, any of which can be foamed or non-foamed, comprising the polyethylene, either alone as the primary polymeric component or in combination with other polymers such as propylene-based impact copolymers, ethylene-propylene-diene rubber (EPDM), high density polyethylene (HDPE), other linear low density polyethylenes (LLDPE), polypropylene, polystyrene, butyl-based polymers, aryl polyester carbonates, polyethylene terephthalate, polybutylene terephthalate, amorphous polyacrylate, nylon-6, nylon-6,6, further polyamides, polyaramids, polyether ketones, polyoxymethylene, polyoxyethylene, polyurethanes, polyether sulfones, and polyvinylidene fluoride. Preferably the polyethylene is used alone in films, sheets, etc., or as a major component, that is, greater than 50, or 60, or 70, or 80 wt % of the article by weight of the article.

The polyethylenes described herein are particularly useful in films, especially blown films. In any embodiment is a film having an intrinsic Tear of greater than 500, or 550, or 600 g/mil, an Elongation of greater than 800, or 850, or 900%, and an MD 1% Secant Flexural Modulus of greater than 150, or 200, or 250, or 300 MPa comprising (or consisting essentially of, or consisting of) the polyethylene described herein. The films may be single-layered, double-layered, three-layered or more, where one or more of the layers comprises or consists essentially of one or more of the polyethylenes.

The various descriptive elements and numerical ranges disclosed herein for the polyethylenes described herein and methods of forming such can be combined with other descriptive elements and numerical ranges to describe the polyethylenes and desirable compositions including such; further, for a given element, any upper numerical limit can be combined with any lower numerical limit described herein, including the examples in jurisdictions that allow such combinations. The features of the polyethylenes are demonstrated in the following non-limiting examples.

Test Methods

Chemical Structure.

A 500 MHz NMR instrument in TCE-d2 solvent at 120° C. and 120 scans. NMR data of the olefin block copolymer were measured by dissolving 20±1 mg of sample in 0.7 ml of d-solvents. The samples are dissolved in TCE-d2 in 5 mm NMR tube at 120° C. until the sample was dissolved. There is no standard used. The TCE-d2 presents as a peak at 5.98 ppm and used as the reference peak for the samples.

Molecular Weight Characteristics and Branching.

The Mw, Mn and Mw/Mn were determined by using a High Temperature GPC (Agilent PL-220), equipped with three in-line detectors, a differential refractive index detector (DRI), a light scattering (LS) detector, and a viscometer. Experimental details, including detector calibration, are described in a paper by T. Sun, P. Brant, R. R. Chance, and W. W. Graessley, in 34(19) MACROMOLECULES, 6812-6820 (2001) and references therein. Three Agilent PLgel 10 μm Mixed-B LS columns were used. The nominal flow rate is 0.5 mL/min, and the nominal injection volume is 300 μL. The various transfer lines, columns, viscometer and differential refractometer (the DRI detector) were contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC. Polymer solutions were prepared by placing dry polymer in a glass container, adding the desired amount of TCB, then heating the mixture at 160° C. with continuous shaking for about 2 hours. All quantities were measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer were purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc),$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description are expressed in g/cm³, molecular weight is expressed in kg/mole or g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\Theta)$ is the measured excess Rayleigh scattering intensity at scattering angle $\Theta$, "c" is the polymer concentration determined from the DRI analysis, $A_2$ is the second virial coefficient. $P(\Theta)$ is the form factor for a mono-disperse random coil, and $K_O$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2,$$

where c is concentration and was determined from the DRI output.

The branching index ($g'_{vis}$) is calculated using the output of the GPC-DRI-LS-VIS method as follows. As models, example 2 below was analyzed as was analyzed as EPDM with 0 wt % propylene in EP and 5.9 wt % ENB; example 1 was analyzed as EPDM with 6.7 wt % propylene (as the substituent for hexene) in EP and 9.3 wt % ENB (as the substituent for NB). The average intrinsic viscosity, $[\eta]_{avg}$, of the sample is calculated by:

$$[\eta]_{avg} = \frac{\Sigma c_i [\eta]_i}{\Sigma c_i},$$

where the summations are over the chromatographic slices, i, between the integration limits.

The branching index g' (or $g'_{vis}$) is defined as:

$$g'vis = \frac{[\eta]_{avg}}{kM_v^\alpha}$$

$M_V$ is the viscosity-average molecular weight based on molecular weights determined by LS analysis. For data processing, the Mark-Houwink constants used were K=0.000579 and a=0.695. Values for Mn are ±50 g/mole, for Mw are ±100 g/mole, and for Mz are ±200.

Strain Hardening.

Extensional Rheometry was performed on an Anton-Paar MCR 501 or TA Instruments DHR-3 using a SER Universal Testing Platform (Xpansion Instruments, LLC), model SER2-P or SER3-G. The SER (Sentmanat Extensional Rheometer) Testing Platform is described in U.S. Pat. Nos. 6,578,413 and 6,691,569. A general description of transient uniaxial extensional viscosity measurements is provided, for example, in "Strain hardening of various polyolefins in uniaxial elongational flow," 47(3) THE SOCIETY OF RHEOLOGY, INC., J. RHEOL., 619-630 (2003); and "Measuring the transient extensional rheology of polyethylene melts using the SER universal testing platform," 49(3) THE SOCIETY OF RHEOLOGY, INC., J. RHEOL., 585-606 (2005). Strain hardening occurs when a polymer is subjected to uniaxial extension and the transient extensional viscosity increases more than what is predicted from linear viscoelastic theory. Strain hardening is observed as abrupt upswing of the extensional viscosity in the transient extensional viscosity versus time plot. A strain hardening ratio (SHR) is used to characterize the upswing in extensional viscosity and is defined as the ratio of the maximum transient extensional viscosity over three times the value of the transient zero-shear-rate viscosity at the same strain. Strain hardening is present in the material when the ratio is greater than 1. The SER instrument consists of paired master and slave windup drums mounted on bearings housed within a chassis and mechanically coupled via intermeshing gears. Rotation of the drive shaft results in a rotation of the affixed master drum and an equal but opposite rotation of the slave drum which causes the ends of the polymer sample to be sound up onto the drums resulting in the sample stretched. The sample is mounted to the drums via securing clamps in most cases. In addition to the extensional test, samples were also tested using transient steady shear conditions and matched to the extensional data using a correlation factor of three. This provides the linear viscoelastic envelope (LVE). Rectangular sample specimens with dimensions approximately 18.0 mm long×12.70 mm wide were mounted on the SER fixture. Samples were generally tested at three Hencky strain rates:

0.01 s$^{-1}$, 0.1 s$^{-1}$ and 1 s$^{-1}$. The testing temperature is 150° C. The polymer samples were prepared as follows: the sample specimens were hot pressed at 190° C., mounted to the fixture, and equilibrated at 150° C.

Shear Thinning.

Small Angle Oscillatory Spectroscopy (SAOS) was performed on the inventive samples and samples B21 to B25, and the "ECD" LLDPE (ECD-103) sample of U.S. Pat. No. 5,942,587 ("Arjunan"). Prepared using hot press (either a Carver Press or Wabash Press) polymer samples were disks of 25 mm in diameter and 2.5 mm in thickness. In order to characterize the shear thinning behavior the rheometer ARES-G2 (TA Instruments) was used to conduct small angle oscillatory shear measurements at angular frequency ranging from 0.01 to 500 rad/s at temperature 190° C. and at a fixed strain of 10%. The data is then converted into viscosity as function of shear rate. To ensure that selected strain provides measurements within linear deformation range the strain sweep measurements have been conducted (at angular frequency of 100 Hz). Data was processed using Trios software.

Morphology.

Atomic Force Microscopy (AFM) is a morphological imaging technique carried out using an Asylum Research Cypher Atomic Force Microscope. Samples were cryo-microtomed prior to scanning in order to create a smooth surface at −120° C. After microtoming, the samples were purged under N$_2$ in a desiccator before evaluation. Imaging was conducted according to the following: The instrument was tuned to the fundamental (1st) mode of the cantilever, setting the amplitude at 1.0 V and the drive frequency to about 5% below the free-air resonance frequency of the cantilever. If running in multifrequency mode, a higher mode (2nd, 3rd, or 4th, depending on cantilever and holder) was selected, setting the amplitude to 100 mV and the drive frequency on resonance. The set point was set to 640 mV, the scan rate to 1 Hz, and the scan angle to 90°. An Asylum Research reference standard (10 microns×10 microns pitch grating×200 nm deep pits) was used for the AFM SQC and X, Y, and Z calibration. The instrument was calibrated to be accurate to within 2% or better of true value for X-Y and within 5% or better for Z. Representative scan sizes were 500×500 nm.

All other test methods used herein are set forth in Table 1:

TABLE 1

Test Methods

| Test | Reference |
| --- | --- |
| Melt Index | ASTM D1238, 190° C., 2.16 kg. |
| Secant Tensile Modulus | ISO 37 |
| Yield Tensile Strength | ISO 37 |
| Ultimate Tensile Strength | ISO 37 |
| Elongation at Break | ISO 37 |
| Tear | ASTM D1922 |

Examples

All inventive polymers were produced using a solution process in a 1.0-liter continuous stirred-tank reactor (autoclave reactor). The autoclave reactor was equipped with a stirrer, a water-cooling/steam-heating element with a temperature controller, and a pressure controller. Solvents and monomers were first purified by passing through purification columns. Purification columns were regenerated periodically (twice/year) or whenever there was evidence of low catalyst activity. Isohexane was used as a polymerization solvent. The solvent was fed into the reactor using a Pulsa pump and its flow rate was controlled by a mass flow controller. The purified ethylene feed was fed to the manifold upstream of the reactor and its flow rate was also regulated by a mass flow controller. A mixture of isohexane and tri-n-octylaluminum (TNOAL) and comonomer (1-hexene, norbornene, or a mix of both) was added to the same manifold through a separate line and the combined mixture of monomers and solvent was fed into the reactor using a single tube. Hydrogen was added in the amounts shown in Table 1 to control molecular weight and effect the level of branching of the polyethylene. The temperature of the reaction was also controlled to 110° C. for both example polymerizations, but can vary to also to effect molecular weight and branching of the polyethylene.

The collected polymers were first placed on a boiling-water steam table in a hood to evaporate a large fraction of the solvent and unreacted monomers, and then dried in a vacuum oven at a temperature of about 90° C. for about 12 hours. The vacuum oven dried samples were weighed to obtain yields. 1-hexene content of the polymers was determined by FTIR and/or NMR whereas the norbornene content of the polymers was determined by NMR. The monomer conversions were calculated using the polymer yield, composition and the amount of monomers fed into the reactor. Catalyst activity (also referred as to catalyst productivity) was calculated based the yield and the feed rate of catalyst. All the reactions were carried out at a gauge pressure of about 2.2 MPa.

The single-site catalyst used in the polymerization was di(p-triethylsilylphenyl)carbyl (cyclopentadienyl)(2,7-di-t-butylfluorenyl) hafnium dimethyl, and the activator used was N,N-dimethylanilinium tetrakis(pentafluorophenyl) borate. Both the catalyst and activator were first dissolved in toluene and the solution was kept in an inert atmosphere. The solutions of catalyst and activator were premixed and fed into the reactor using an ISCO syringe pump. The catalyst to activator feed ratio (molar) was set at 0.98. Tri-n-octylaluminum (TNOAL) solution (available from Sigma Aldrich, Milwaukee, Wis.) was further diluted in isohexane and used as a scavenger.

For Inventive example 1, norbornene monomer was dissolved in isohexane and the solution was purified by flowing it through a basic alumina bed while bubbling nitrogen gas through it. The purified norbornene was then premixed with isohexane and 1-hexene, and then the mixture was fed to the manifold upstream of the reactor using the comonomer feeding system. For Inventive example 2, norbornene was dissolved in toluene and purified as in Inventive example 1. This solution was premixed with isohexane and fed to the manifold upstream of the reactor using the comonomer feeding system.

A summary of the process conditions (Table 2) and product properties (Table 3) are as follows. The ethylene derived units ("C2"), 1-hexene derived units ("C6") and norbornene derived units ("NB") are expressed as weight percent based on the weight of the entire polyethylene.

TABLE 2

Process Conditions

| Example | ethylene Feed (g/min) | 1-hexene Feed (g/min) | NB Feed (g/min) | Catalyst Feed (mol/min) | Activator Feed (mol/min) | Scavenger Feed (mol/min) | Isohexane Feed (g/min) | $H_2$ (cm³/min) |
|---|---|---|---|---|---|---|---|---|
| 1 | 5.1 | 0.68 | 1.14 | $1.24 \times 10^{-7}$ | $1.26 \times 10^{-7}$ | $7.37 \times 10^{-6}$ | 62.3 | 18.1 |
| 2 | 5.1 | none | 0.39 | $1.65 \times 10^{-7}$ | $1.69 \times 10^{-7}$ | $7.37 \times 10^{-6}$ | 60.3 | 12.1 |

TABLE 3

Product Properties

| Example | C2 (wt %) | C6 (wt %) | NB (wt %) | Polymer (g/min) | Polymer (wt %) | Cat Efficiency (g poly/g cat) | MI (g/10 min) | Quantity (g) |
|---|---|---|---|---|---|---|---|---|
| 1 | 84.0 | 6.7 | 9.3 | 2.0 | 5.04 | 17,009 | 2.04 | 19.9 |
| 2 | 94.1 | 0.0 | 5.9 | 3.7 | 14.60 | 23,910 | 0.35 | 37.3 |

Polymer Characterization by NMR.

Figure 2:
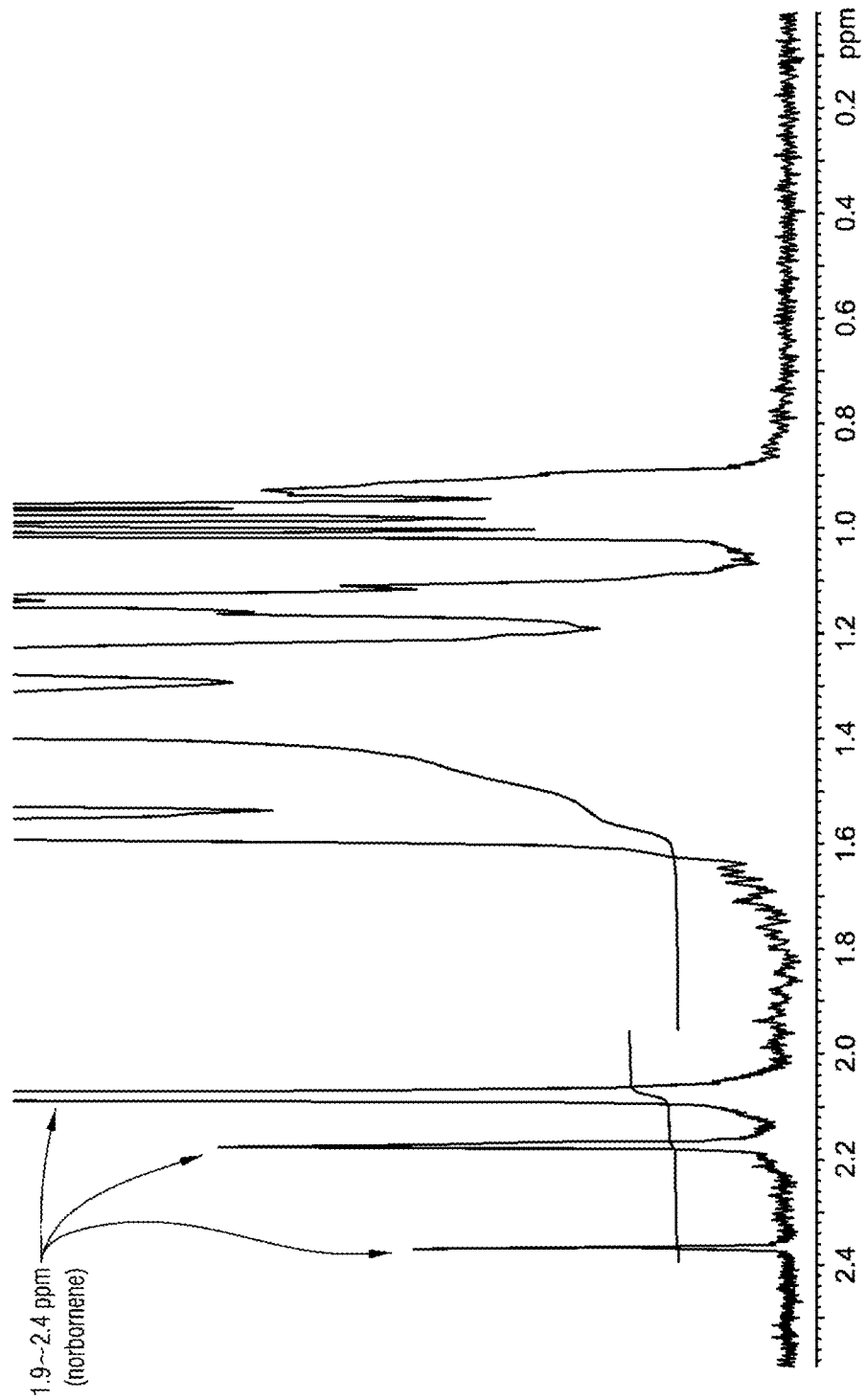
FIG. 2 is an $^1$H NMR of the inventive example 2, ethylene-norbornene copolymer.
Figure 3A:
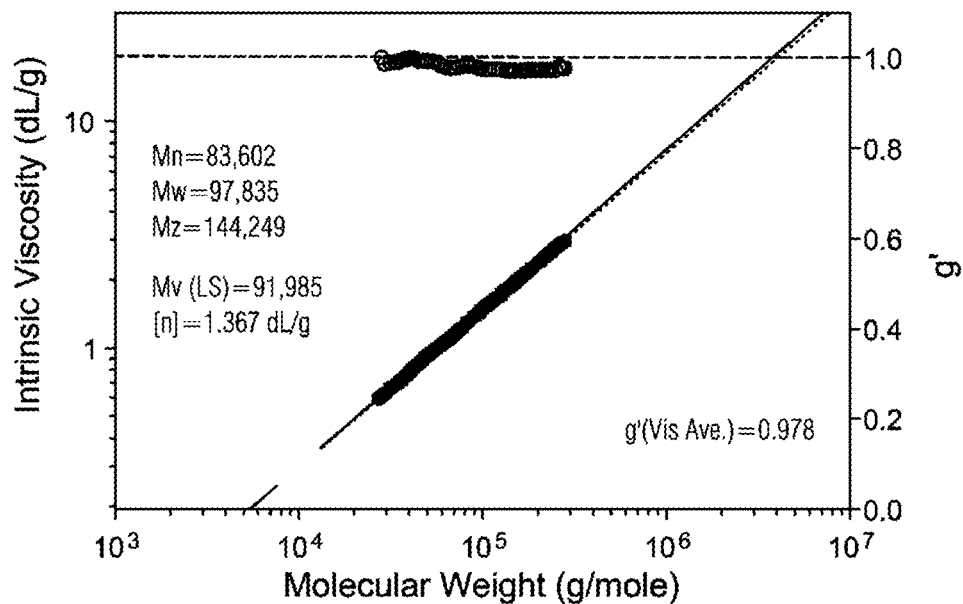
FIGS. 3a and 3b are Gel Permeation Chromatograms (GPC) and viscosity profiles for the inventive examples.
Figure 3A:
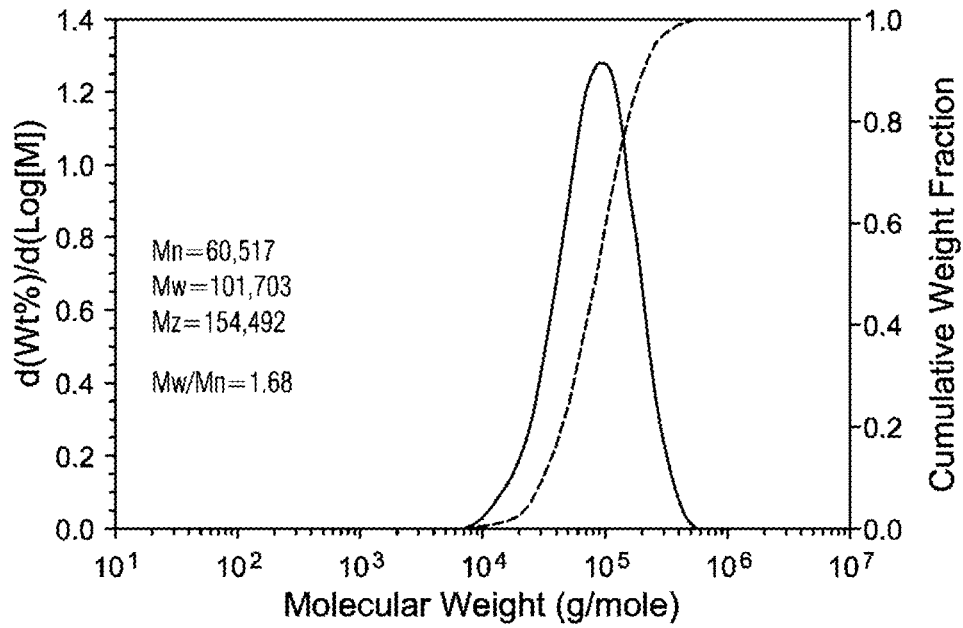
Figure 3B:
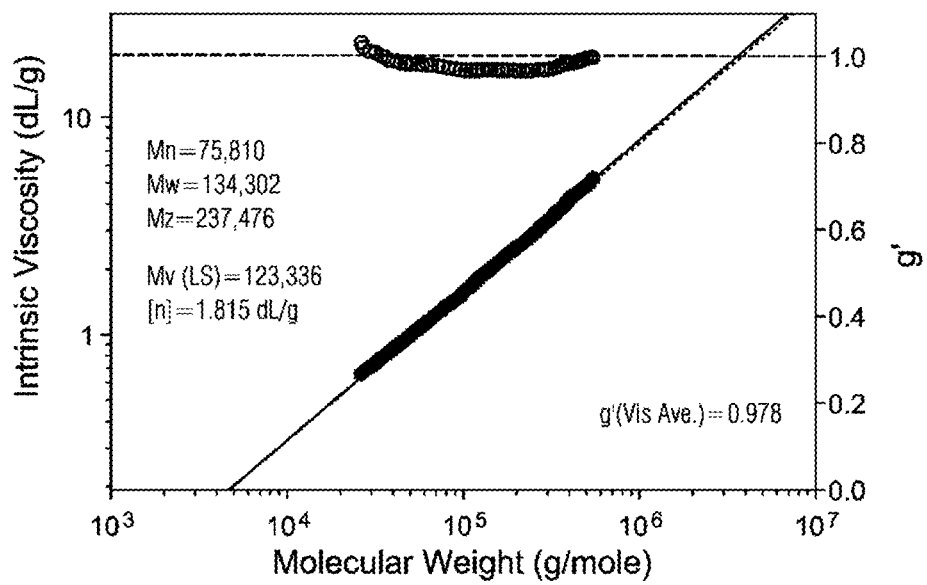
Figure 3B:
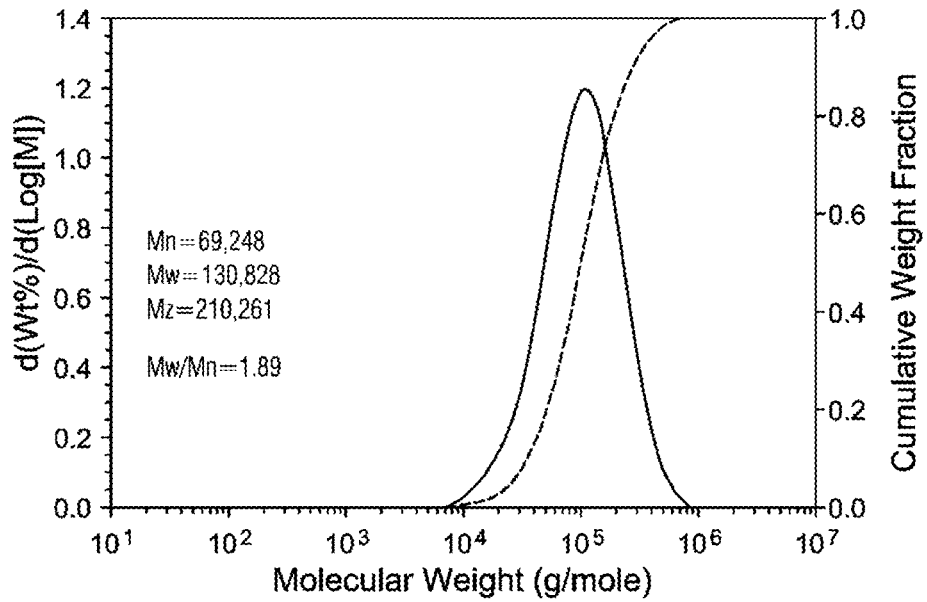

The polymer products were characterized by proton nuclear magnetic resonance ($^1$H NMR) spectroscopy. The $^1$H NMR spectra of terpolymer Inventive example 1 (terpolymer) and inventive example 2 (copolymer) are shown in FIG. 1 and FIG. 2 respectively. The peaks in the 1.92 to about 2.4 ppm region were assigned to norbornene and used to calculate the norbornene concentration in the polymer. The peaks in the 0.85 to about 1.05 ppm region were assigned to the terminal methyl group of the 1-hexene comonomer and used to calculate the hexene derived unit concentration in the polymer.

Narrow MW Distribution and Linearity by GPC.

GPC traces of Inventive example 1 and Inventive example 2 are shown in FIG. 3. Both polymers show unimodal distribution and narrow molecular weight distribution (Mw/Mn<1.9) as well as g' values close to 1. The molecular weights are comparable to that of Exceed™ 1018 LLDPE (Mw about 108 kg/mol).

Shear Thinning of Polyethylene Copolymer.

Figure 4:
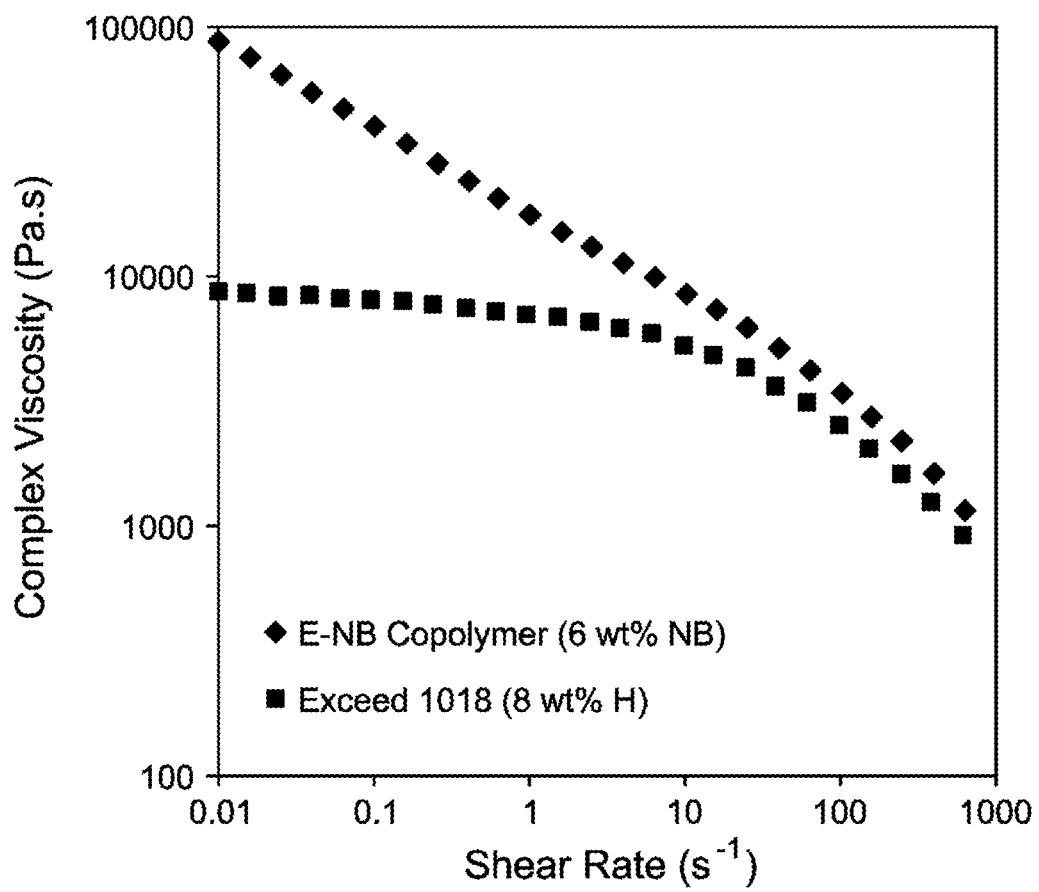
FIG. 4 are complex viscosity as a function of shear rate data for inventive and comparative polyethylenes.
Figure 5:
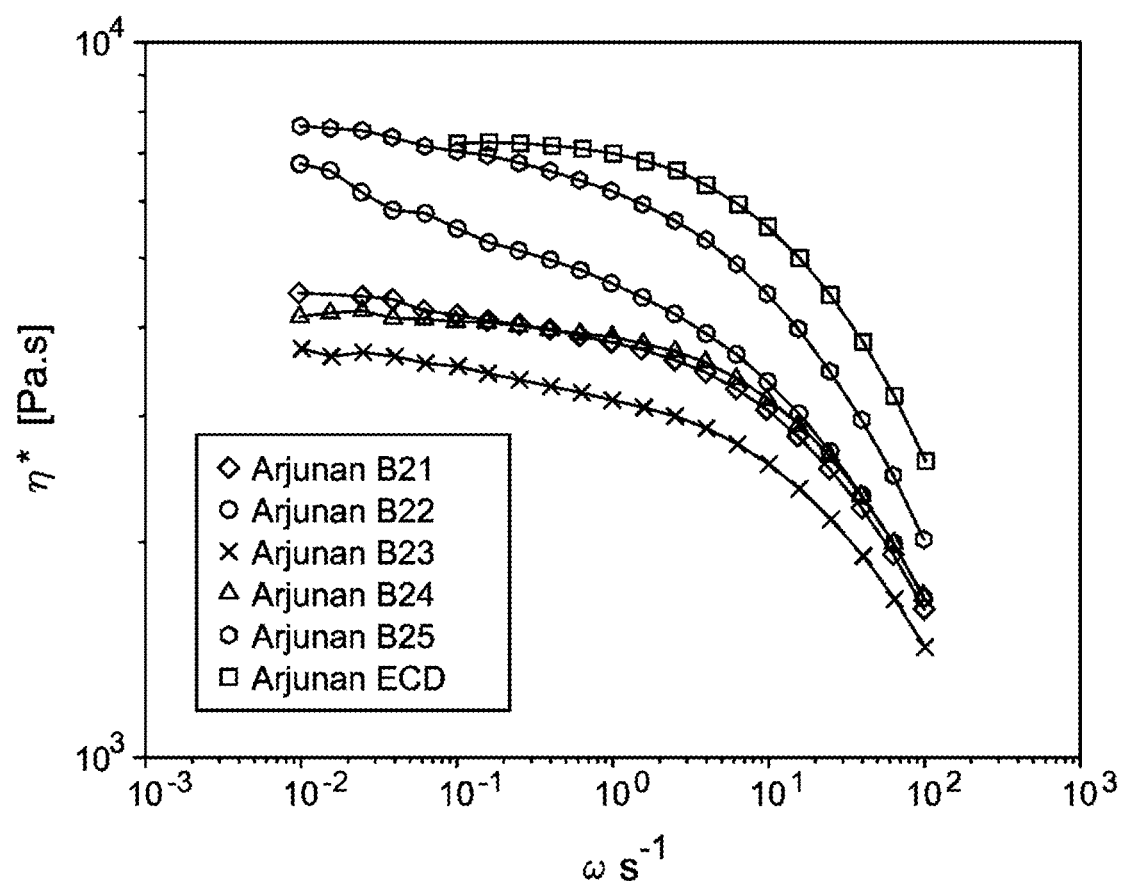
FIG. 5 are complex viscosity plots for comparative polyethylenes from U.S. Pat. No. 5,942,587.

The inventive copolymer exhibits strong shear thinning compared to Exceed 1018 LLDPE (FIG. 4). As a reference, the complex viscosity versus shear rate plots of some previous gas-phase copolymers disclosed in U.S. Pat. No. 5,942,587 ("Arjunan") are shown in FIG. 5, where no substantial shear thinning was observed (viscosity levels off at low shear rates instead of increasing).

Strain Hardening.

The extensional viscosities of the polymer melt at 150° C. are shown in FIG. 6. Exceed 1018 LLDPE has essentially no strain hardening (FIG. 6a). The post-reactor blend approach (addition of low-level high-cyclic polyethylenes) provides modest strain hardening but the melt is easily broken when stretched (FIG. 6b). Exceed 1018 LLDPE contains 8 wt % hexene comonomer and Topas™ 5013 cyclic olefin copolymer (COC) contains 78 wt % norbornene comonomer, therefore the Exceed 1018 LLDPE blend with 10 wt % Topas 5013 COC contains 7 wt % hexene and 8 wt % norbornene. The inventive example 1 with similar comonomer contents as the blend exhibits excellent strain hardening (FIG. 6c). Moreover, the inventive example 2 also has much improved strain hardening (FIG. 6d). The calculated SHR at 150° C., 0.1 s$^{-1}$ strain rate for Exceed 1018 LLDPE was 1.6, for Exceed 1018 with 10 wt % Topas 5018 was 2.9, for inventive example 1 was 3.4, and the SHR for inventive example 2 was 4.

Mechanical Properties.

The Inventive polyethylenes and Exceed 1018 LLDPE resins were compression molded and the resulting films were subjected to tensile and tear tests. The data are summarized in Table 4. For comparison purpose, blown films of Exceed 1018 LLDPE and gas-phase COC terpolymer are also listed. The gas phase COC terpolymer blown films are typically 3 to 5 mil thickness. The Exceed 1018 blown film is about 1 mil in thickness. All the compression-molded films are about 2 mil in thickness. All the data are normalized to thickness. The "GP" is a gas-phase produced LLDPE terpolymer blown into a film.

TABLE 4

Mechanical Properties of the Films

| Measured property | Unit | Exceed 1018 (blown) | Exceed 1018 (compression) | GP-terpolymer (blown) | Inventive example 1 (compression) | Inventive example 2 (compression) |
|---|---|---|---|---|---|---|
| 1% Secant Tensile Modulus | MPa | 180 | 149 | 321 | 176.9 | 345.7 |
| Yield Tensile Strength | MPa | 9.5 | 10.1 | 11 | 10 | 12.9 |
| Ultimate Tensile Strength | MPa | 60 | 44.9 | 49 | 28.8 | 35.9 |
| Elongation at Break | % | 480 | 1070.5 | 548 | 860.5 | 1180.8 |
| Tear | g/mil | 250 | 421.8 | 494 | 557 | 842 |

The inventive polyethylene (Inventive copolymer 2) has twice of the tensile modulus as Exceed 1018 and demonstrates improvement compared to the previous gas phase terpolymer made according to U.S. Pat. No. 5,942,587. Yield strength is 35% higher than Exceed 1018 LLDPE and also higher than the gas phase terpolymer. Elongation at break is better than that of Exceed 1018 LLDPE processed the same way. The tear property of the inventive polyethylenes is twice the intrinsic tear strength of Exceed 1018 LLDPE, three times of the MD tear strength of Exceed 1018 LLDPE, and 70% higher than the MD tear strength of the gas phase terpolymer.

Morphological Properties of the Solution-Produced Polyethylenes.

Figure 7A:
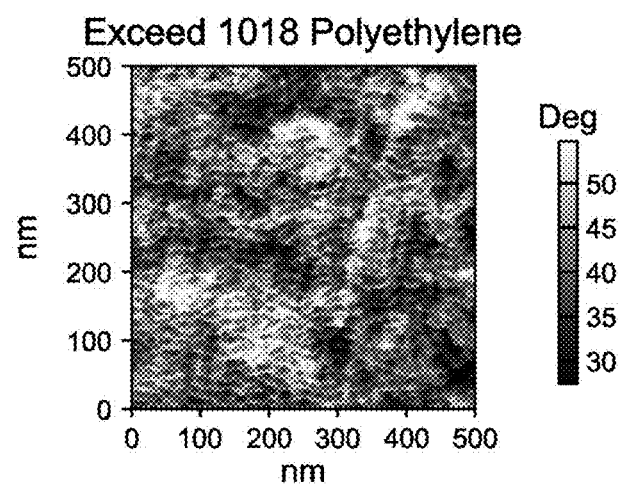
FIGS. 7a-c are Atomic Force Micrograms (AFM) of comparative (a) and inventive polyethylenes (b) and (c).
Figure 7B:
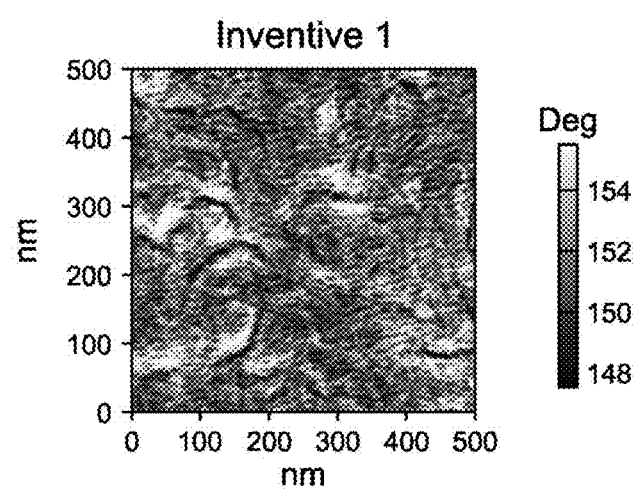
Figure 7C:
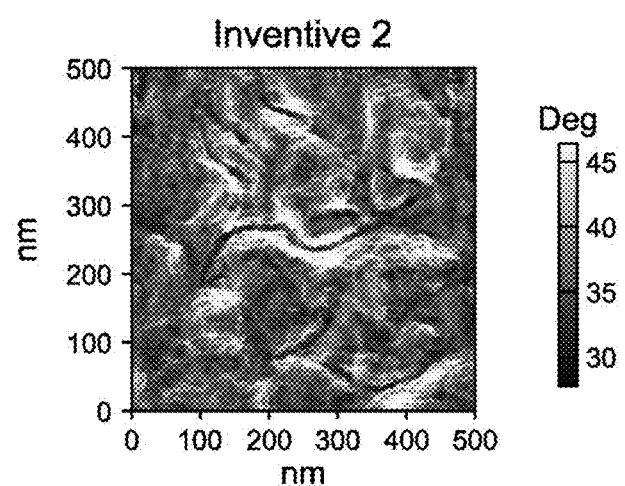

The Inventive polyethylenes also have unique morphology, distinctive from Exceed 1018 LLDPE (FIG. 7a). As shown in the bimodal AFM images in FIGS. 7b and 7c, both the inventive polyethylenes exhibit worm-like structures in nanometers width and 50 to about 500 nm length, presumably due to the assembly of norbornene-rich segments of the polymer chains. These worm-like structures are very different from the shish-kabob assembly of polyethylene crystallites of FIG. 7a, instead they possess alternating dark-light segments, indicating the sparsely distributed norbornene comonomer contents. The worm-like assemblies mostly reside in the amorphous phase. As a result, they weave and reinforce the polymer matrix. Longer worms can be seen in the Inventive copolymer 2 sample, which has no additional hexene comonomer, possibly because higher continuous assembly can be achieved without hexene comonomer interruption. The morphological properties are consistent with the observed improvements of the Inventive copolymer 2 sample in shear thinning, strain hardening, and mechanical properties.

These results demonstrate the surprising differences in the inventive polyethylenes when made in a solution process compared to a gas phase process such as in U.S. Pat. No. 5,942,587. The inventive polyethylenes exhibit more strain hardening as well as shear thinning than the gas-phase counterparts. Thus, the inventive polyethylenes will have improved processability and productivity in film blowing processes while maintaining or enhancing the mechanical properties of the resulting films. The inventive polyethylenes will also provide improved melt strength that is required in applications such as extrusion coating and foamed articles.

The phrase "consisting essentially of" in a polymer composition or components in a process means that no other additives, monomers, and/or catalysts are present in the composition or process being referred to other than those named, or, if present, are present to a level no greater than 0.5, or 1.0, or 2.0, or 4.0 wt % by weight of the composition; and also in a process, "process . . . consisting essentially of" means that no other major process step is present that effects the formation of covalent chemical bonds between two or more moieties, for example, exposure to external radiation, addition of reactive cross-linking agents, another polymerization step, etc., but minor process features and changes that effect the rate of covalent bond formation as is claimed may be present, such as, for example, a change in temperature or pressure or concentration of components. "Additives" includes such common compounds as antioxidants, acid scavengers, fillers, colorants, alkyl radical scavengers, UV absorbers, hydrocarbon resins, antislip agents, antiblock agents, etc.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A polymer consisting essentially of 0.5 to 20 wt % of cyclic olefin derived units, 0 wt % to 15 wt % $C_4$ to $C_{12}$ α-olefin derived units, and 95.5 to 65 wt % ethylene derived units; said polymer having a Mw/Mn of less than 2.5;

a weight average molecular weight (Mw) within a range from 80 to 300 kg/mole;

a g' value of greater than 0.95;

a complex viscosity of 70 to 160 kPa·s at a shear rate of 0.01 $s^{-1}$ at 190° C.; and a complex viscosity of 5 to 40 kPa·s at a shear rate of 100 $s^{-1}$ at 190° C.

2. The polymer of claim 1, wherein cyclic olefins, ethylene, and optionally $C_4$ to $C_{12}$ α-olefins are combined in a solution process to form the polymer.

3. The polymer of claim 1, exhibiting rod-like morphology having dimensions within a range from 1 to 10 nm in width and 50 to 1000 nm in length below solidifying temperature.

4. The polymer of claim 1, having an Mw/Mn value within a range from 1.1 to 2.5.

5. The polymer of claim 1, having a z-average molecular weight of 180 kg/mole to 300 kg/mole.

6. The polymer of claim 1, having an Mz/Mw of less than 2.5.

7. The polymer of claim 1, having a complex viscosity within a range from 70 to 140 kPa·s at a shear rate of 0.01 $s^{-1}$ at 190° C.

8. The polymer of claim 1, having a complex viscosity within a range from 30 to 5 kPa·s at a shear rate of 100 $s^{-1}$ at 190° C.

9. The polymer of claim 1, having an extensional viscosity of at least 600 kPa·s above the LVE at a strain rate of 0.1 $s^{-1}$ at 150° C.

10. The polymer of claim 1 having a strain hardening ratio (SHR) of greater than 3 at 150° C. at 0.1 $s^{-1}$ strain rate.

11. The polymer of claim 1, wherein the cyclic olefin derived units are selected from $C_5$ to $C_{20}$ olefin derived units comprising at least one $C_5$ to $C_8$ cyclic structure.

12. The polymer of claim 1, wherein the cyclic olefin derived units are norbornene or $C_1$ to $C_{10}$ alkyl-substituted norbornene derived units.

13. The polymer of claim 1, consisting of cyclic olefin derived units and ethylene derived units.

14. The polymer of claim 2, wherein a single-site catalyst is combined with the cyclic olefins, ethylene, and optional $C_4$ to $C_{12}$ α-olefins in the solution process.

15. The polymer of claim 14, wherein the single-site catalyst is selected from the following structures:

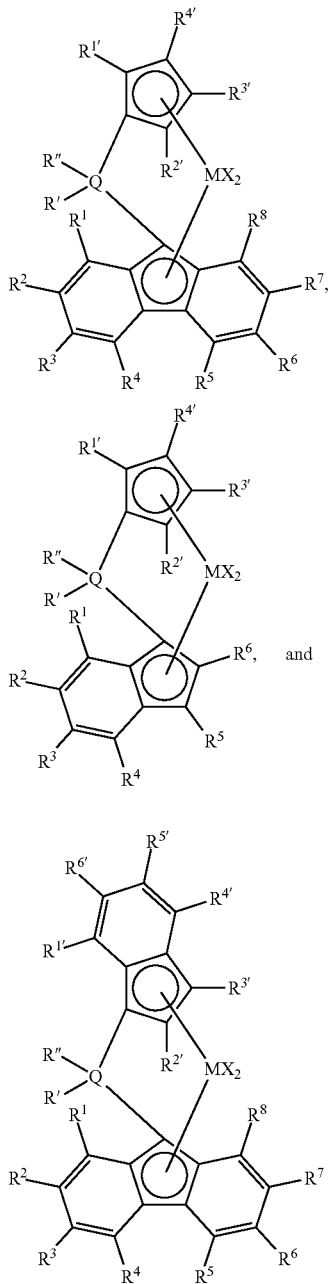

wherein:
M is a Group 4 metal;
Q is silicon or carbon;
each R' and R" are selected from phenyl, alkyl substituted phenyl, and silyl substituted phenyl;
each X is independently selected from $C_1$ to $C_{10}$ alkyls, phenyls, and halogens;
each of $R^1$ to $R^8$ is independently selected from hydrogen, $C_1$ to $C_{10}$ alkyls, phenyls, and alkylphenyls; and
each of $R^{1'}$ to $R^{6'}$ is independently selected from hydrogen, $C_1$ to $C_{10}$ alkyls, and phenyls.

16. The polymer of claim 14, wherein the single-site catalyst is selected from:

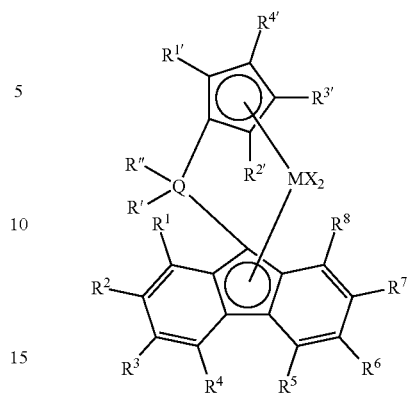

wherein:
M is a Group 4 metal;
Q is silicon or carbon;
each R' and R" are independently selected from phenyl, alkyl substituted phenyl, and silyl substituted phenyl;
each X is independently selected from $C_1$ to $C_{10}$ alkyls, phenyls, and halogens;
each of $R^1$ to $R^8$ is independently selected from hydrogen, $C_1$ to $C_{10}$ alkyls, phenyls, and alkylphenyls; and
each of $R^{1'}$ to $R^{6'}$ is independently selected from hydrogen, $C_1$ to $C_{10}$ alkyls, and phenyls.

17. A film having an intrinsic Tear of greater than 500 g/mil, an Elongation of greater than 800%, and an MD 1% Secant Flexural Modulus of greater than 150 MPa comprising the polymer of claim 1.

18. A thermoformed article, a foamed article, or an extrusion coated article comprising the polymer of claim 1.

19. A process to form a polymer comprising combining in a solution polymerization process cyclic olefins, ethylene, hydrogen and optional alpha olefin comonomers selected from the group consisting of $C_4$ to $C_{12}$ α-olefins with a single-site catalyst to form the polymer, wherein the single-site catalyst is selected from the following structures:

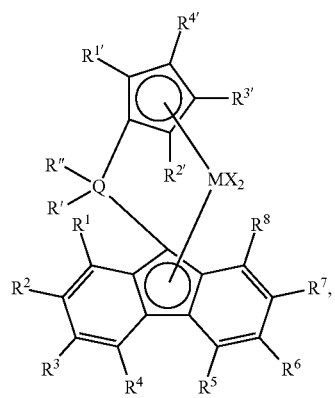

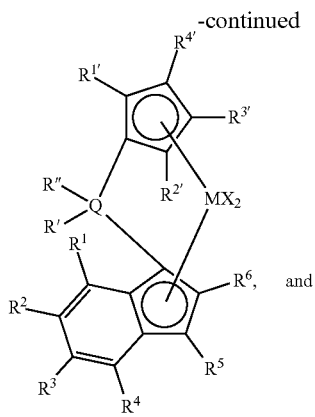

and

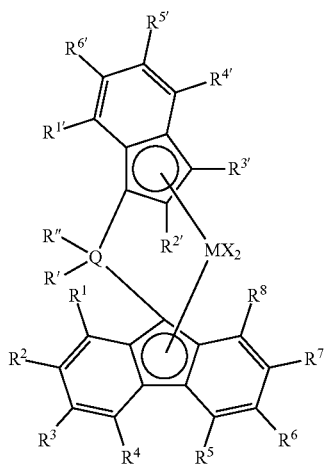

wherein:

M is a Group 4 metal;

Q is silicon or carbon;

each R' and R" are selected from phenyl, alkyl substituted phenyl, and silyl substituted phenyl;

each X is independently selected from $C_1$ to $C_{10}$ alkyls, phenyls, and halogens;

each of $R^1$ to $R^8$ is independently selected from hydrogen, $C_1$ to $C_{10}$ alkyls, phenyls, and alkylphenyls; and each of $R^{1'}$ to $R^{6'}$ is independently selected from hydrogen, $C_1$ to $C_{10}$ alkyls, and phenyls;

wherein the polymer consists essentially of 0.5 to 20 wt % of cyclic olefin derived units, 0 wt % to 15 wt % $C_4$ to $C_{12}$ α-olefin derived units, and 95.5 to 65 wt % ethylene derived units and the polymer has a g' value of greater than 0.95, a Mw/Mn of less than 2.5; a weight average molecular weight (Mw) within a range from 80 to 300 kg/mole; a complex viscosity of 70 to 160 kPa·s at a shear rate of 0.01 $s^{-1}$ at 190° C.; and a complex viscosity of 5 to 40 kPa·s at a shear rate of 100 $s^{-1}$ at 190° C.

20. The process of claim 19, wherein the single-site catalyst is selected from:

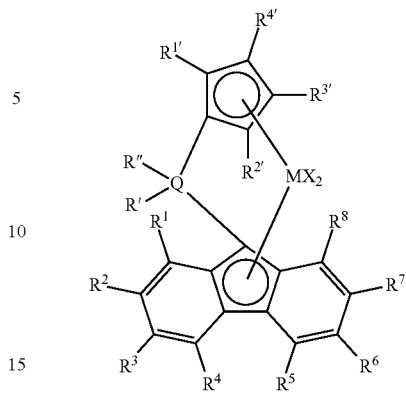

wherein:

M is zirconium or hafnium;

Q is silicon or carbon;

each R' and R" are independently selected from phenyl, alkyl substituted phenyl, and silyl substituted phenyl;

each X is independently selected from $C_1$ to $C_{10}$ alkyls, phenyls, and halogens;

each of $R^1$ to $R^8$ is independently selected from hydrogen, $C_1$ to $C_{10}$ alkyls, phenyls, and alkylphenyls; and each of $R^{1'}$ to $R^{6'}$ is independently selected from hydrogen, $C_1$ to $C_{10}$ alkyls, and phenyls.

21. The process of claim 19, wherein the polymer consists essentially of 1 to 15 wt % of cyclic olefin derived units, 1 to 15 wt % $C_4$ to $C_{12}$ α-olefin derived units, and 98 to 70 wt % ethylene derived units.

22. The process of claim 19, wherein the polymer has a Mw/Mn of less than 2.5; and a weight average molecular weight (Mw) within a range from 80,000 to 200,000 g/mole.

23. The process of claim 19, wherein the single-site catalyst is combined with monomers at a temperature within the range from 80° C. to 150° C.

24. A polymer obtained by a solution polymerization process with a single-site catalyst wherein the polymer consists essentially of 0.5 to 20 wt % of cyclic olefin derived units, 0 wt % to 15 wt % $C_4$ to $C_{12}$ α-olefin derived units, and 95.5 to 65 wt % ethylene derived units and the polymer has a g' value of greater than 0.95, a Mw/Mn of less than 2.5; a weight average molecular weight (Mw) within a range from 80 to 200 kg/mole; a complex viscosity of 70 to 160 kPa·s at a shear rate of 0.01 $s^{-1}$ at 190° C.; and a complex viscosity of 5 to 40 kPa·s at a shear rate of 100 $s^{-1}$ at 190° C.

25. The polymer of claim 24, exhibiting rod-like morphology having dimensions within a range from 1 to 10 nm in width and 50 to 1000 nm in length below solidifying temperature.

26. The polymer of claim 24, having a complex viscosity of 70 to 140 kPa·s at a shear rate of 0.01 $s^{-1}$ at 190° C.; and a complex viscosity of 5 to 30 kPa·s at a shear rate of 100 $s^{-1}$ at 190° C.

27. A film having an intrinsic Tear of greater than 500 g/mil, an Elongation of greater than 800%, and an MD 1% Secant Flexural Modulus of greater than 150 MPa comprising a polymer consisting essentially of 0.5 to 20 wt % of cyclic olefin derived units, 0 wt % to 15 wt % $C_4$ to $C_{12}$ α-olefin derived units, and 95.5 to 65 wt % ethylene derived units; the polymer having a Mw/Mn of less than 2.5;
a weight average molecular weight (Mw) within a range from 80 to 300 kg/mole;
a g' value of greater than 0.95;
a complex viscosity of 70 to 160 kPa·s at a shear rate of 0.01 s$^{-1}$ at 190° C.; and
a complex viscosity of 5 to 40 kPa·s at a shear rate of 100 s$^{-1}$ at 190° C.

* * * * *